(12) United States Patent
Tabibnia

(10) Patent No.: US 12,043,965 B2
(45) Date of Patent: Jul. 23, 2024

(54) SYNTHETIC TURF SYSTEM

(71) Applicant: Ramin Tabibnia, Los Angeles, CA (US)

(72) Inventor: Ramin Tabibnia, Los Angeles, CA (US)

( * ) Notice: Subject to any disclaimer, the term of this patent is extended or adjusted under 35 U.S.C. 154(b) by 0 days.

(21) Appl. No.: 18/033,798

(22) PCT Filed: Dec. 6, 2021

(86) PCT No.: PCT/US2021/062057
§ 371 (c)(1),
(2) Date: Apr. 25, 2023

(87) PCT Pub. No.: WO2022/120283
PCT Pub. Date: Jun. 9, 2022

(65) Prior Publication Data
US 2023/0304229 A1 Sep. 28, 2023

Related U.S. Application Data

(60) Provisional application No. 63/121,818, filed on Dec. 4, 2020.

(51) Int. Cl.
*E01C 13/08* (2006.01)
*A01G 9/033* (2018.01)
(Continued)

(52) U.S. Cl.
CPC .............. *E01C 13/08* (2013.01); *B32B 3/266* (2013.01); *B32B 3/30* (2013.01); *B32B 7/05* (2019.01);
(Continued)

(58) Field of Classification Search
None
See application file for complete search history.

(56) References Cited

U.S. PATENT DOCUMENTS 4,905,437 A * 3/1990 Heather ............ E04F 15/02447
52/480
6,202,374 B1 * 3/2001 Cooper ................. H02G 3/285
52/220.8
(Continued)

FOREIGN PATENT DOCUMENTS

AU 2013207651 B2 2/2014
CA 2822305 C 4/2016
(Continued)

OTHER PUBLICATIONS

Machine Translation of JP-06057904-U, Aug. 1994 (Year: 1994).*
Machine Translation of JP-07144376-A, Jun. 1995 (Year: 1995).*

Primary Examiner — Jeffrey A Vonch
(74) Attorney, Agent, or Firm — Lance M. Pritikin

(57) ABSTRACT

Example implementations of a synthetic turf system comprise a turf tray and a turf element. The turf tray is rigid and planar, and has a lattice structure extending within the lateral perimeter. The turf element includes a backing portion and a blade portion. The blade portion is defined by a plurality of blades of artificial grass affixed to the backing portion, the backing portion is placed secured engagement with the upper side by way of, for example, adhesive or screws. The turf trays may include perimeter and auxiliary adhesive tracks, and an array of screw retention bosses. The system may include a sprinkler assembly mountable in the turf trays for washing down the turf elements. The sprinkler assembly may include mounting flanges configurable to accommodate mounting of various sprinklers. The system may include height-adjustable pedestals or joists to support the turf trays at a distance above the local horizonal surface.

7 Claims, 16 Drawing Sheets

(51) Int. Cl.
    *B32B 3/24*     (2006.01)
    *B32B 3/26*     (2006.01)
    *B32B 3/30*     (2006.01)
    *B32B 7/05*     (2019.01)
    *B32B 7/08*     (2019.01)
    *B32B 7/14*     (2006.01)
    *E04F 15/02*    (2006.01)
    *E04F 15/024*   (2006.01)
    *B05B 15/622*   (2018.01)
    *E04D 11/00*    (2006.01)

(52) U.S. Cl.
    CPC .............. *B32B 7/08* (2013.01); *B32B 7/14* (2013.01); *E04F 15/02183* (2013.01); *E04F 15/02194* (2013.01); *E04F 15/02405* (2013.01); *E04F 15/02452* (2013.01); *E04F 15/02464* (2013.01); *A01G 9/033* (2018.02); *B05B 15/622* (2018.02); *E04D 11/007* (2013.01); *E04F 15/0247* (2013.01); *Y10T 428/161* (2015.01); *Y10T 428/169* (2015.01); *Y10T 428/24298* (2015.01); *Y10T 428/24331* (2015.01); *Y10T 428/2457* (2015.01); *Y10T 428/24777* (2015.01); *Y10T 428/24802* (2015.01); *Y10T 428/249923* (2015.04)

(56) References Cited

U.S. PATENT DOCUMENTS

| | | | |
|---|---|---|---|
| 6,606,823 B1 * | 8/2003 | McDonough | A01G 9/033 52/173.3 |
| 6,711,851 B2 * | 3/2004 | Mischo | A01G 9/033 47/65.9 |
| 8,453,391 B2 | 6/2013 | Tabibnia | |
| 8,850,753 B2 | 10/2014 | Tabibnia | |
| 9,284,693 B2 | 3/2016 | Tabibnia | |
| 9,410,296 B2 | 8/2016 | Tabibnia | |
| 9,879,385 B2 | 1/2018 | Tabibnia | |
| 10,060,082 B2 | 8/2018 | Sawyer et al. | |
| 2004/0074170 A1 * | 4/2004 | Huang | E04F 15/02452 52/220.1 |
| 2006/0242901 A1 * | 11/2006 | Casimaty | A01G 9/033 47/65.9 |
| 2009/0260284 A1 * | 10/2009 | Barbalho | A01G 9/033 47/65.9 |
| 2010/0064609 A1 * | 3/2010 | Busby | E04F 15/02183 52/489.2 |
| 2013/0239476 A1 * | 9/2013 | Meyer | A01G 25/00 47/65.9 |
| 2014/0286704 A1 * | 9/2014 | Bennett | E01C 5/22 156/60 |
| 2014/0325924 A1 * | 11/2014 | Schuster | E01C 5/14 52/177 |
| 2017/0152635 A1 * | 6/2017 | Tabibnia | E04F 15/02482 |
| 2017/0292227 A1 * | 10/2017 | Kim | E01C 5/22 |
| 2018/0112417 A1 * | 4/2018 | Cipriani | E04F 15/02452 |
| 2018/0135311 A1 * | 5/2018 | Cipriani | E04F 15/0247 |
| 2019/0112822 A1 * | 4/2019 | Busby | E04F 15/02183 |
| 2019/0308214 A1 | 10/2019 | Anuskiewicz et al. | |
| 2020/0123786 A1 | 4/2020 | Pommier | |
| 2020/0299906 A1 * | 9/2020 | Repasky | E01C 9/002 |
| 2020/0299974 A1 * | 9/2020 | Repasky | E04F 15/02458 |
| 2023/0287691 A1 * | 9/2023 | Pegoraro | E04B 5/48 |

FOREIGN PATENT DOCUMENTS

| | | | |
|---|---|---|---|
| CA | 2899937 C | 4/2016 | |
| CA | 2886866 C | 7/2017 | |
| EP | 3251492 A1 | 12/2017 | |
| EP | 2933396 B1 | 9/2019 | |
| JP | 04047007 A * | 2/1992 | |
| JP | 06057904 U * | 8/1994 | |
| JP | 07144376 A * | 6/1995 | |
| WO | WO-03066995 A1 * | 8/2003 | E04F 15/024 |
| WO | WO-2010131789 A1 * | 11/2010 | E01C 13/08 |

* cited by examiner

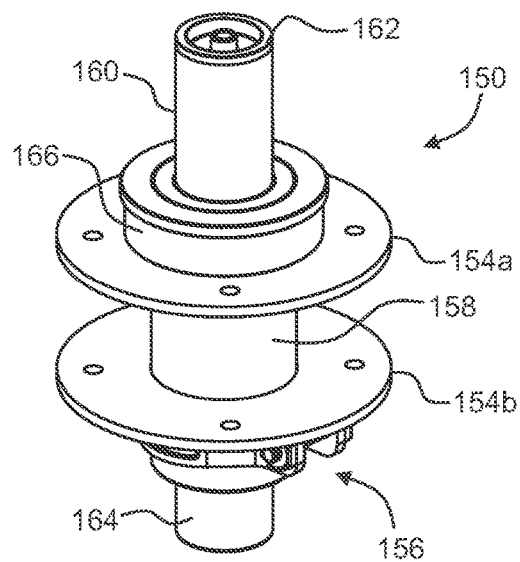
FIG. 9
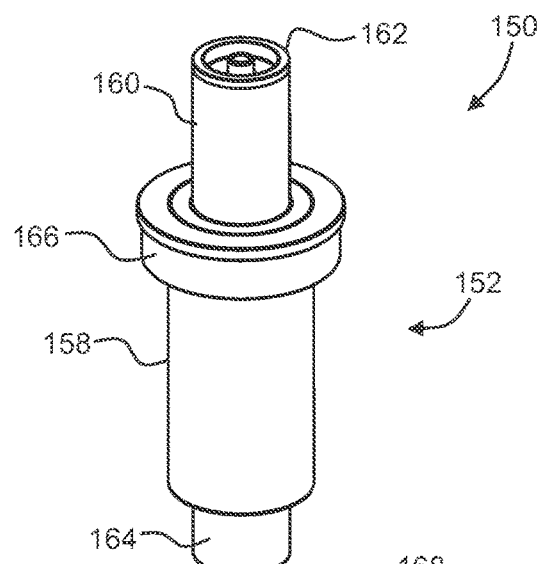
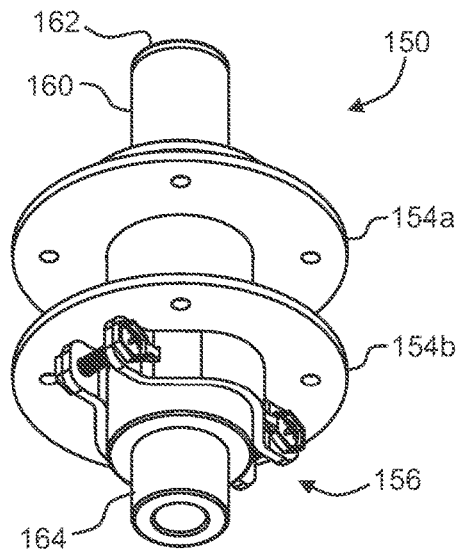
FIG. 10
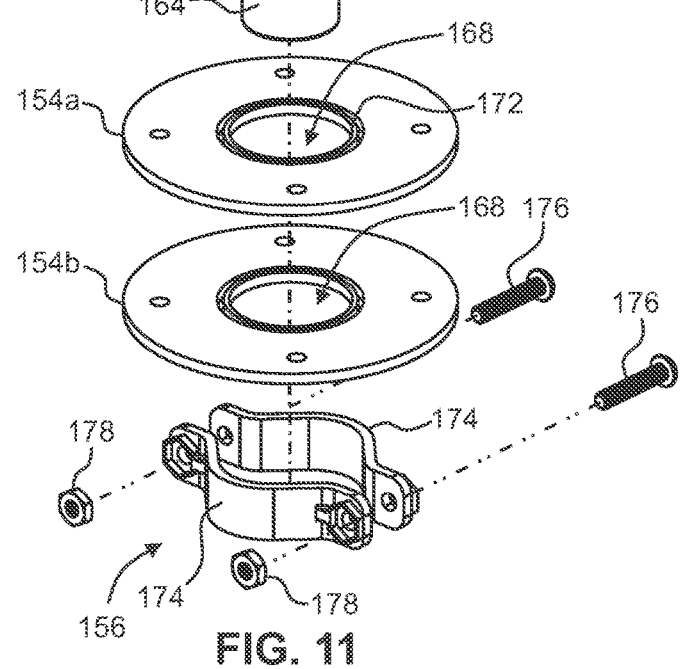
FIG. 11

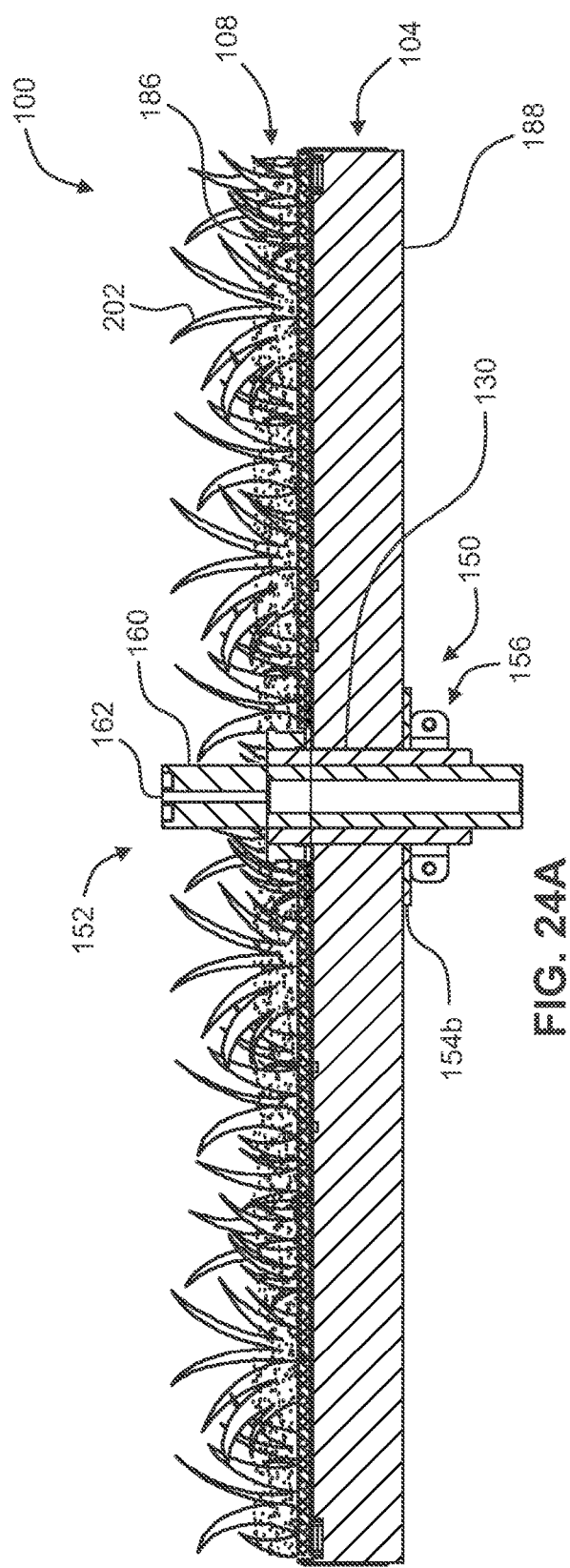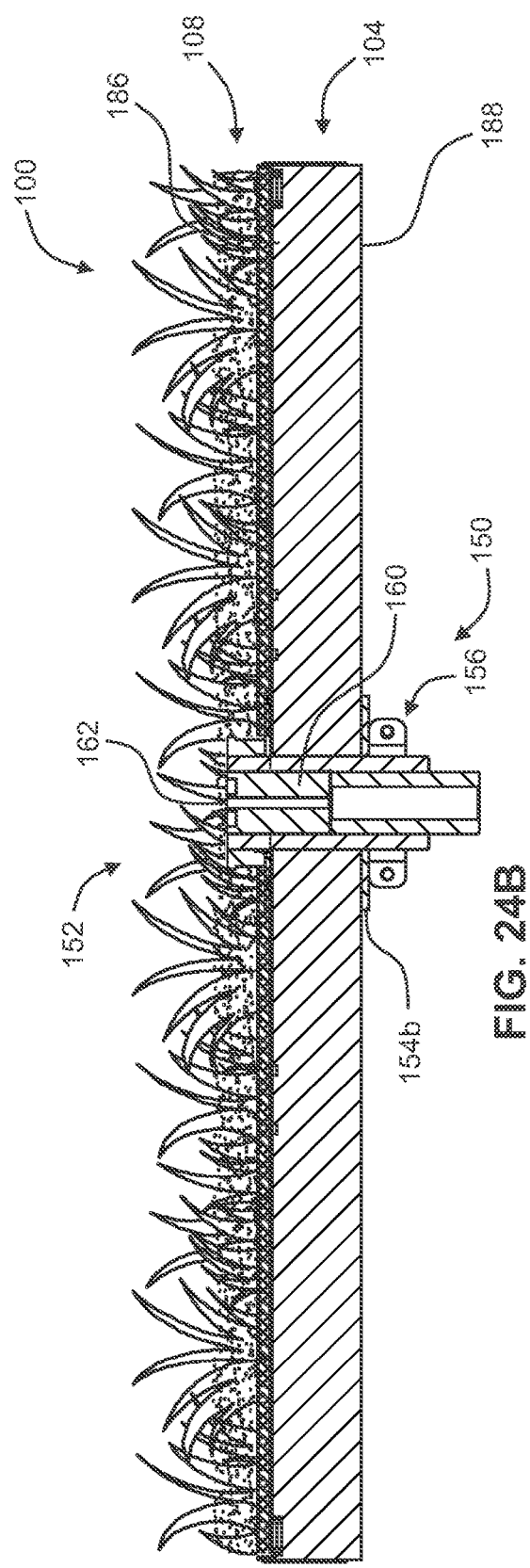

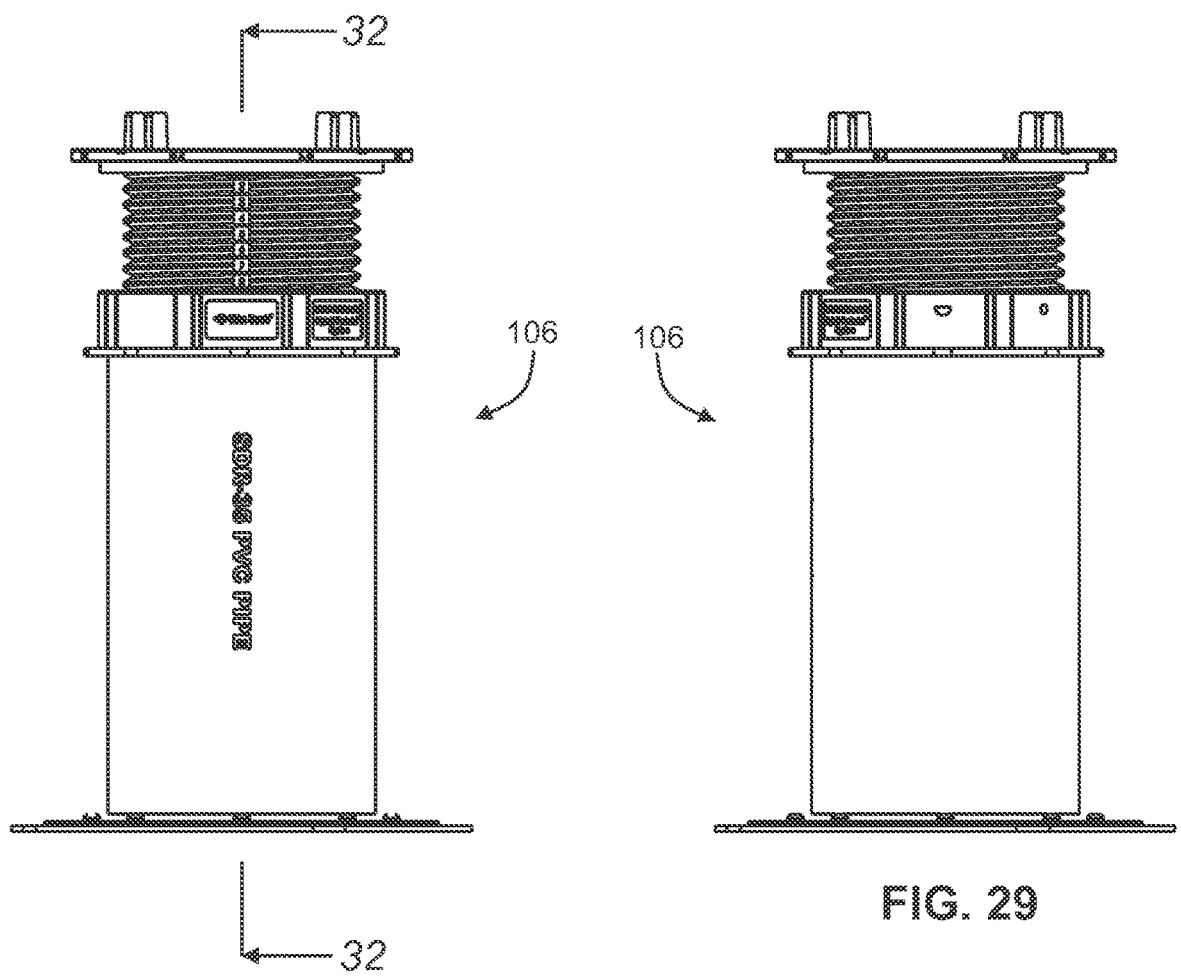
FIG. 28
FIG. 29
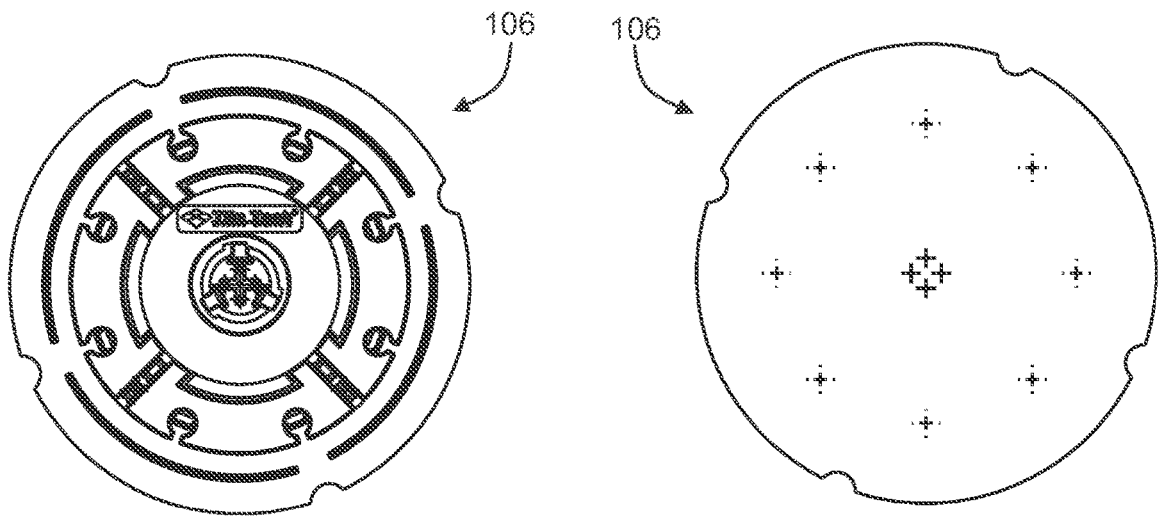
FIG. 30
FIG. 31

SYNTHETIC TURF SYSTEM

RELATED APPLICATIONS

This application is a U.S. national stage of PCT International Patent Application No. PCT/US2021/062057 having an international filing date of Dec. 6, 2021, which claims the benefit of U.S. Provisional Application No. 63/121,818 filed Dec. 4, 2020. All of the above-identified applications are incorporated by this reference in their entireties for all purposes as if fully set forth herein.

TECHNICAL FIELD

The present disclosure relates generally to the field of raised deck and flooring systems.

SUMMARY

Certain deficiencies of the prior art may be overcome by the provision of a synthetic turf system and associated components and methods, as disclosed herein.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 9 is a perspective view of one non-limiting example implementation of a sprinkler subassembly in accordance with the present disclosure;

FIG. 10 is a further perspective view of the sprinkler subassembly of FIG. 9;

FIG. 11 is an exploded view of the sprinkler subassembly of FIG. 9;

FIG. 24A is a cross-sectional view taken along lines 24-24 in FIG. 23, but wherein a turf element is mounted to the turf tray and the shaft of the sprinkler element is shown in an extended position;

FIG. 24B is a cross-sectional view similar to that of FIG. 24A, but wherein the shaft of the sprinkler element is shown in a retracted position;

FIG. 28 is a diagrammatic side view of the pedestal element of FIG. 26;

FIG. 29 is a further diagrammatic side view of the pedestal element of FIG. 6, but oriented orthogonally from the view of FIG. 28;

FIG. 30 is a diagrammatic top view of the pedestal element of FIG. 26;

FIG. 31 is a diagrammatic top view of the pedestal element of FIG. 26;

DETAILED DESCRIPTION OF THE PREFERRED EMBODIMENTS

Figure 1:
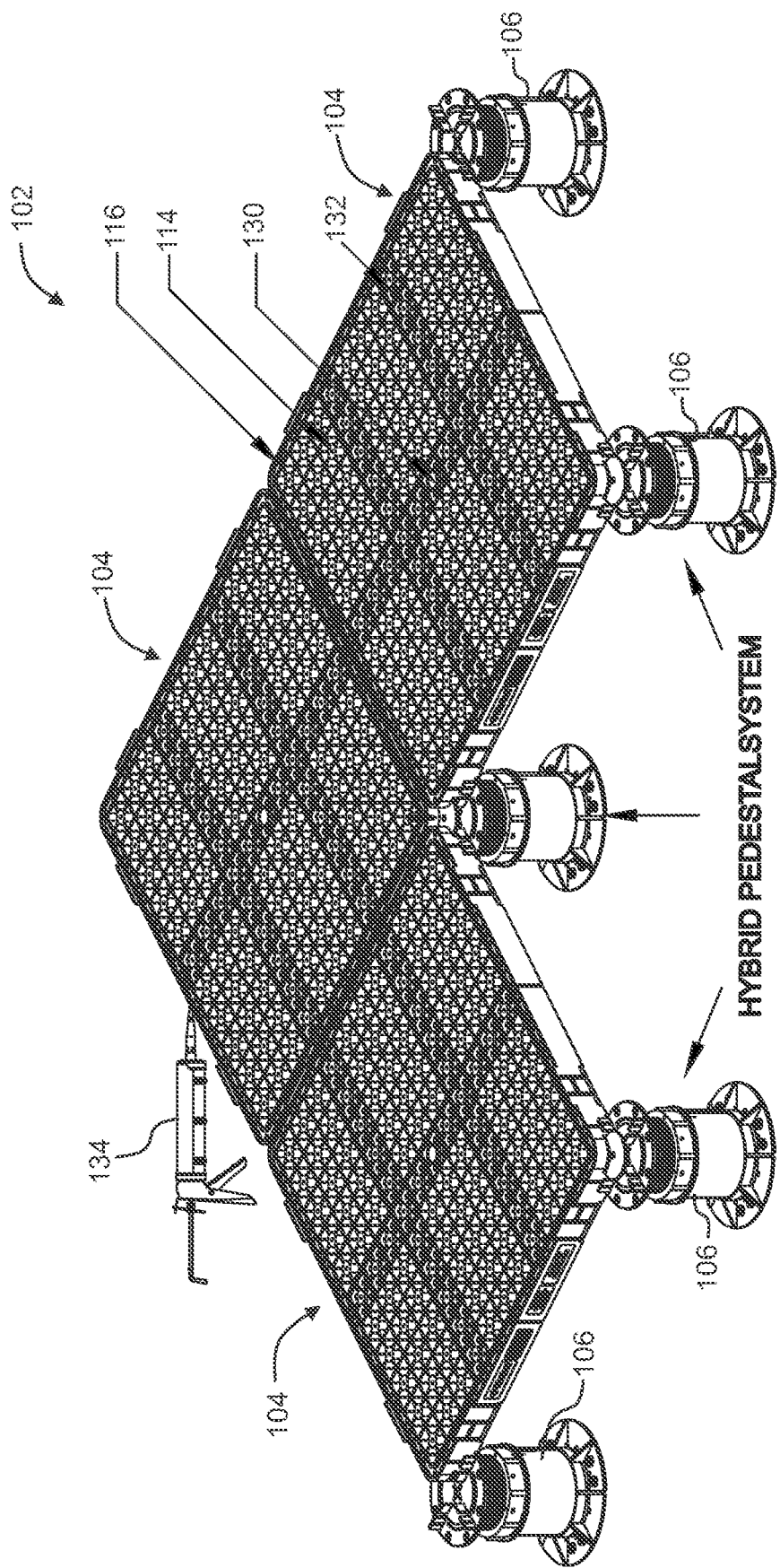
FIG. 1 is a diagrammatic perspective view of one example implementation of a support structure for a synthetic turf system, including turf trays secured to respective pedestal elements.

Referring now to the drawings, like reference numerals designate identical or corresponding features throughout the several views.

Figure 21:
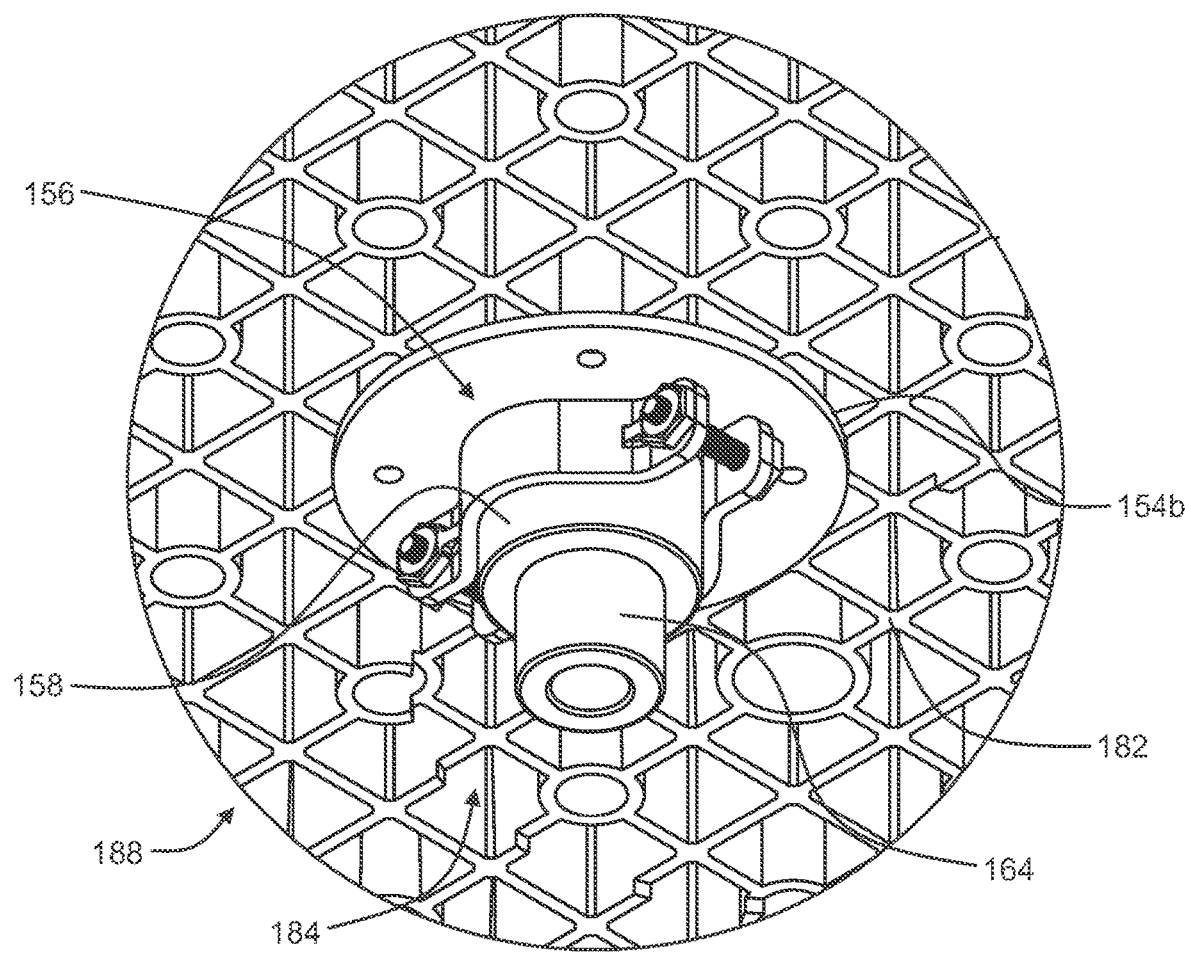
FIG. 21 is a magnified view of the lower side of the turf tray in FIG. 20, showing the sprinkler subassembly secured in mounted engagement with the turf tray by way of a mounting detent and a lower mounting flange.
Figure 22:
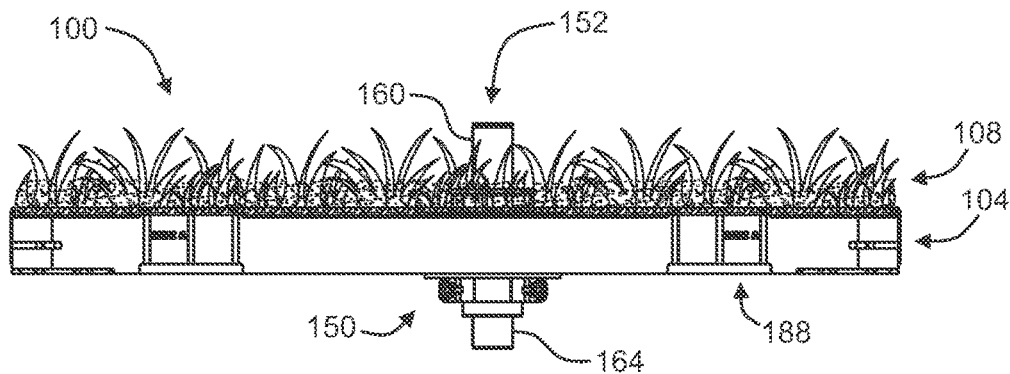
FIG. 22 is side view of an example implementation of a synthetic turf system including a sprinkler subassembly.

A synthetic turf system 100 may comprise at least a turf tray 104 and a turf element 108. A turf tray 104 may be rigid and planar, and may have a lateral perimeter 105, an upper side 186, a lower side 188, and a lattice structure 182 extending within the lateral perimeter 105 (see, for example, FIGS. 2, 19 and 21). A turf element 108 may be formed in flexile sheets or rolls (as with convention artificial turf) configured to be applied to the turf tray in planar fashion. Compositionally, the turf elements 108 may include a backing portion 146 and a blade portion 144. The blade portion 144 may be defined by a plurality of blades 202 of artificial grass affixed to the backing portion 146. The backing portion 146 may be configured to be placed in secured engagement with the upper side 186. In particular implementations, the blades 202 may be comprised of monofilament PE. The blades may be arranged in a pile configuration, with a pile height of, for example, 1-2 inches. The turf element 108 may include particulate infill 148, such as sand.

Figure 2:
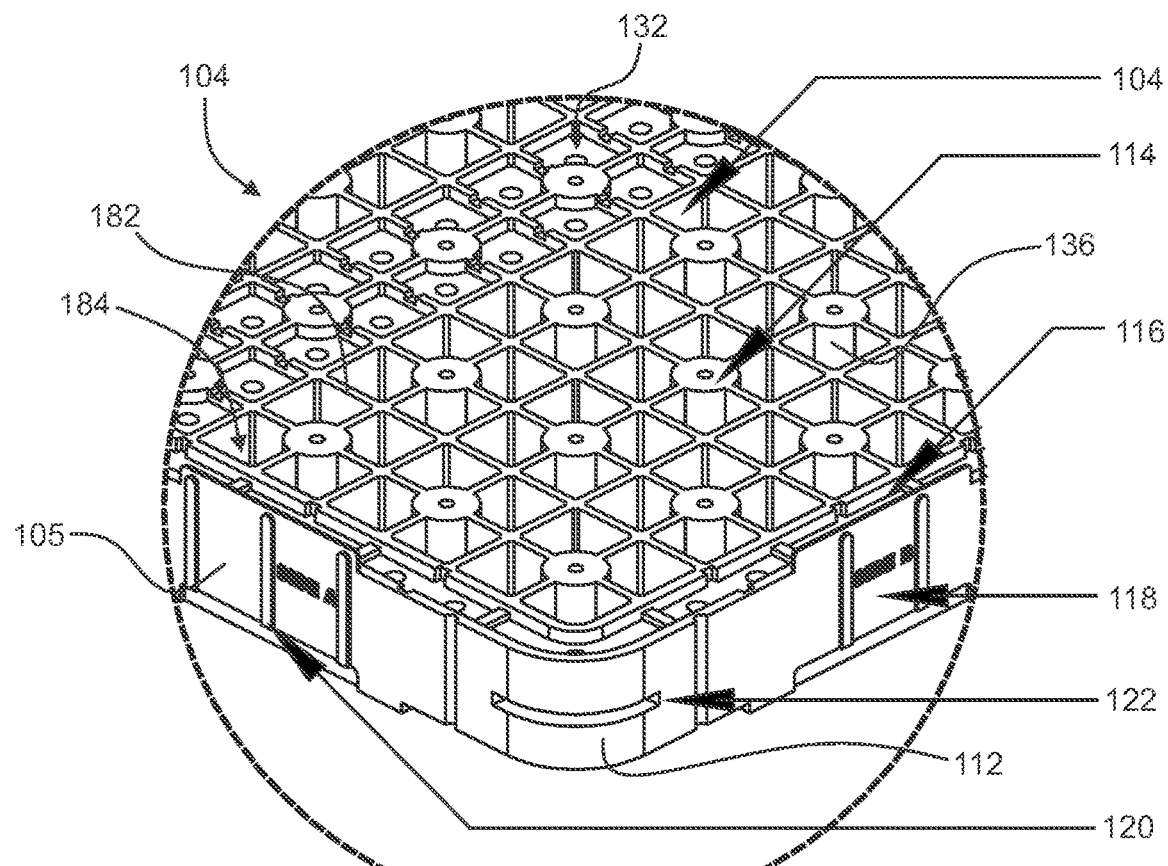
FIG. 2 is a partial perspective view of one example implementation of a turf tray, illustrating various features thereof.
Figure 23:
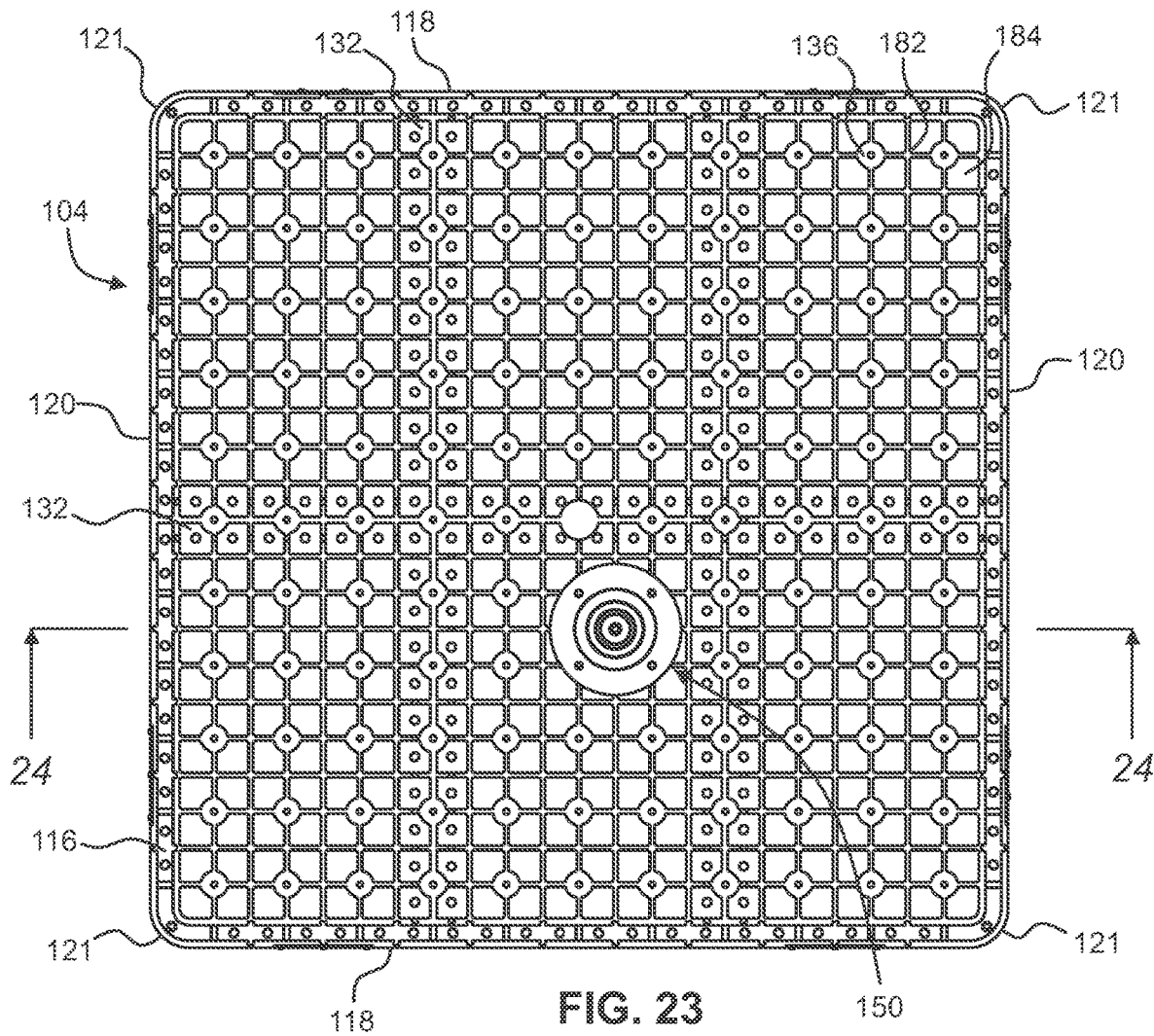
FIG. 23 is top view of an example implementation of a turf tray with a sprinkler subassembly in mounted engagement therewith.

Referring to FIGS. 2 and 23, the lateral perimeter 105 may include a pair of first lateral sides 118 disposed oppositely of one another, a pair of second lateral sides 120 disposed oppositely of one another, and pedestal securement interfaces 122 defined at each corner 112 where the first lateral sides 118 intersect a respective said second lateral side 120. The pedestal securement interfaces 122 may comprise a lock disk slot 124 for engagement by a lock disk 126 of a pedestal element 106.

Figure 4:
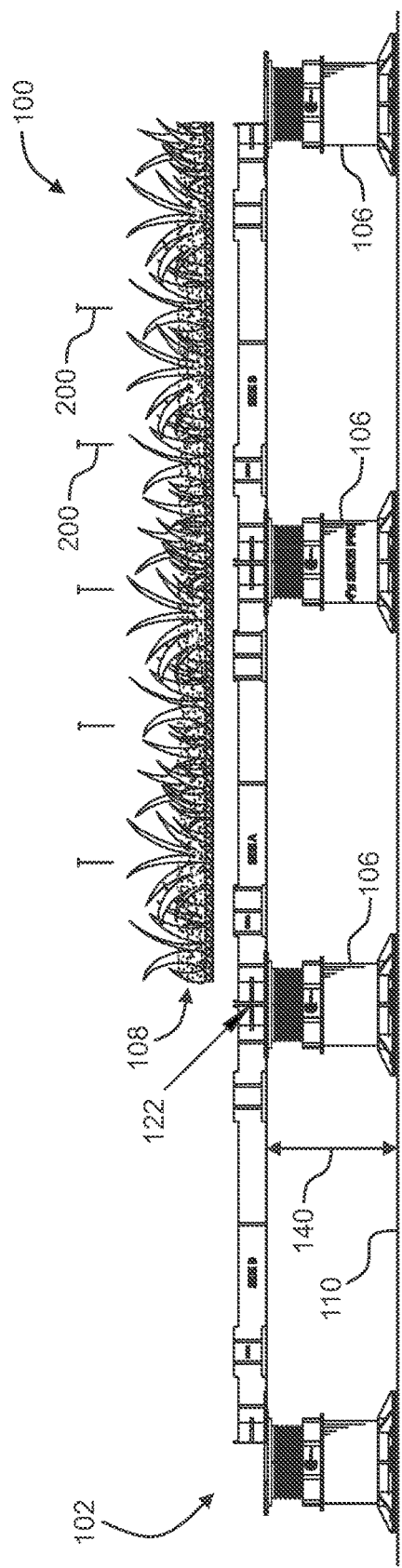
FIG. 4 is a side view of one example implementation of a synthetic turf system, wherein a turf element and associated turf fasteners are shown separated from the support structure prior to adhesive or threaded attachment of the turf element to the respective turf tray.

Referring to FIGS. 1, 2 and 23, the turf tray 104 may include a plurality of elongated adhesive channels (for example 116 or 132) disposed in the upper side. The adhesive channels are configured to receive an adhesive (such as, for example, SUREBOND™ SB-190 adhesive) for bonding the backing portion 146 of the turf element 108 to the turf tray 104. The turf tray 104 may include an array of screw retention bosses 136 disposed throughout the lattice structure 182. Referring to FIGS. 2 and 4, each screw retention boss 136 may be being configured to threadedly receive a respective turf fastener 200 (e.g., a screw) for fastening the turf element 108 to the turf tray 104. Linear arrangements of screw retention bosses may define respective screw tracks 114.

Referring to FIGS. 2 and 23, the adhesive channels may include, for example, a perimeter adhesive track 116 extending around the turf tray 104 adjacent the lateral perimeter 105. The perimeter adhesive track 116 may be continuous, or may be segmented. In addition, the adhesive channels may include a multiplicity of auxiliary adhesive tracks 132 disposed inboard of the perimeter adhesive track 116. In particular implementations of the synthetic turf system 100, the turf trays 104 may include auxiliary adhesive tracks 132 instead of a perimeter adhesive track 116. Referring to FIG. 23, in particular implementations of the synthetic turf system 100, at least one of the auxiliary adhesive tracks 132 may extend perpendicularly to the first lateral sides 118, and at least one of the auxiliary adhesive tracks 132 may extend parallel to the first lateral sides 118.

Figure 18:
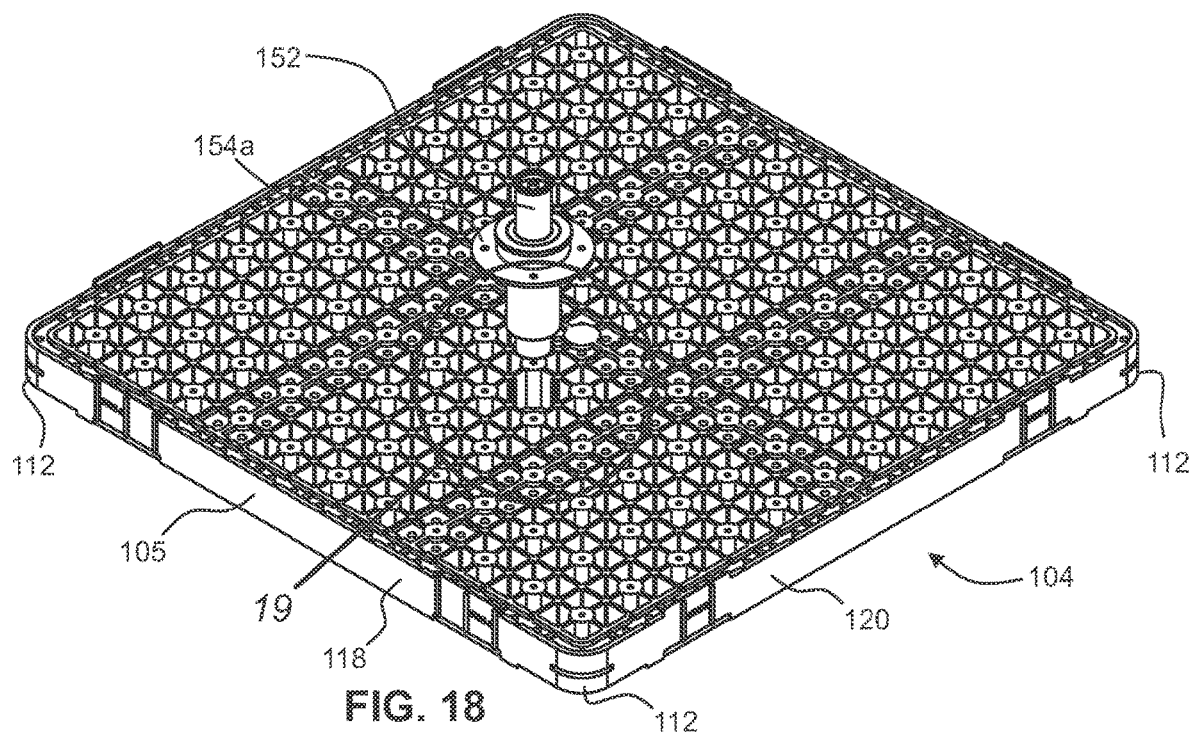
FIG. 18 is a perspective view of a turf tray and a sprinkler subassembly, wherein a sprinkler aperture is shown having been formed in the lattice of the turf tray, and a corresponding sprinkler element is shown prepared to be inserted into the sprinkler aperture.
Figure 19:
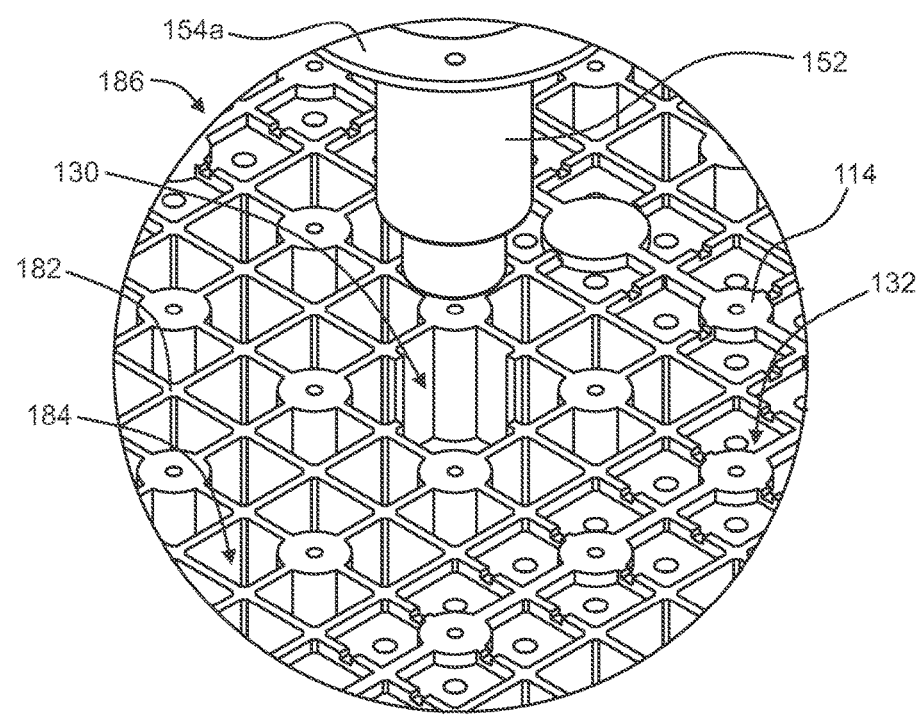
FIG. 19 is magnified view of detail 19 in FIG. 18.
Figure 20:
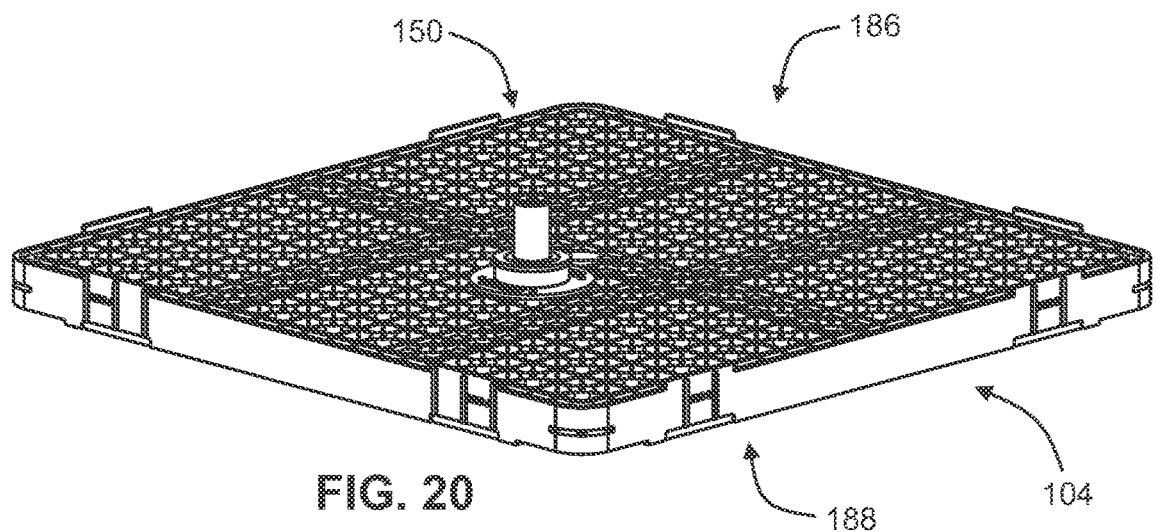
FIG. 20 is a perspective view of the components shown in FIG. 18, but wherein the sprinkler element have been inserted in the sprinkler aperture in the lattice of the turf tray.

Referring to FIGS. 18, 19 and 24A, in certain implementations of a synthetic turf system 100, a sprinkler aperture 130 extends through the lattice structure 182 from the lower side 188 to the upper side 186. The sprinkler aperture 130 may be configured to receive a water pipe 194 or sprinkler element 152 extending therethrough.

Figure 16:
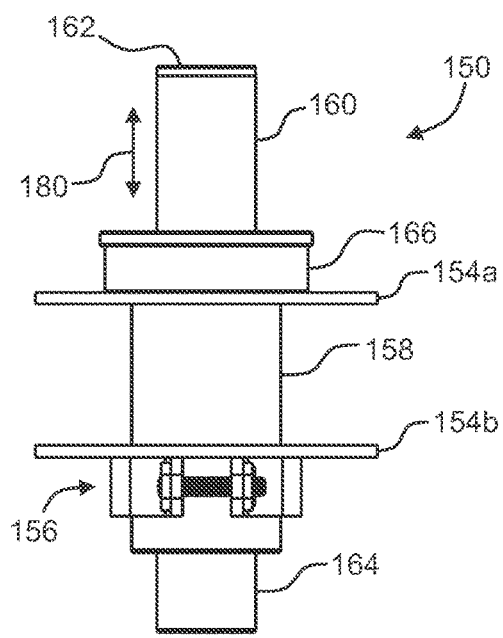
FIG. 16 is a side view of the sprinkler subassembly of FIG. 9; showing the sprinkler shaft in an extended position with respect to the sprinkler body.
Figure 17:
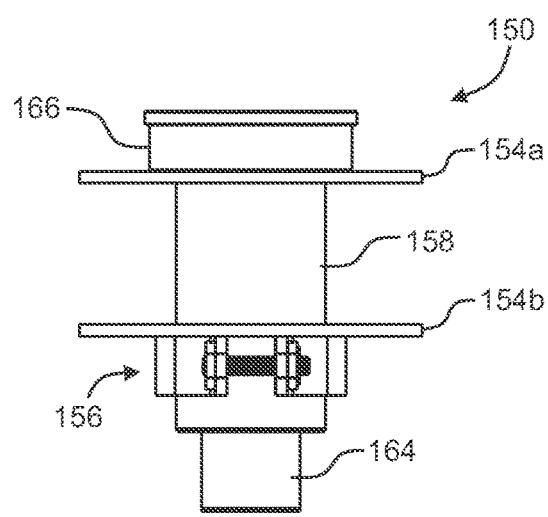
FIG. 17 is a side view similar to that of FIG. 16; but showing the sprinkler shaft in a retracted position with respect to the sprinkler body.

Referring to FIGS. 19 and 24A, a synthetic turf system 100 may comprising a sprinkler element 152 configured to be in mounted engagement with the turf tray 104 and extend through a sprinkler aperture 130 disposed in the lattice structure 182. Referring to FIG. 11, the sprinkler element 152 may have a body 158, a shaft 160, a head 162 and pipe fitting 164. As with conventional sprinklers, the shaft 160 may be movable between an extended position (shown, for example, in FIG. 16) and a retracted position (shown, for example, in FIG. 17) with respect to the body 158. Such movement may be in a vertical direction 180. The pipe fitting 164 may be configured to be placed in water receiving engagement with a water pipe 194. Referring to FIGS. 11 and 16, the body 158 may include a shoulder portion 166.

Referring to FIGS. 11 and 16, a sprinkler subassembly 150 may include a sprinkler element 152, an upper mounting flange 154a, a lower mounting flange 154b and a mounting detent 156. Referring to FIGS. 19-22, the sprinkler element 152 may be placed in the mounted engagement with the turf tray 104, with the upper mounting flange 154a being disposed between the shoulder portion 166 and the upper side 186, the lower mounting flange 154b being disposed between the mounting detent 156 and the lower side 188, and the mounting detent 156 retaining the sprinkler element 152 in the mounted engagement.

Figure 14:
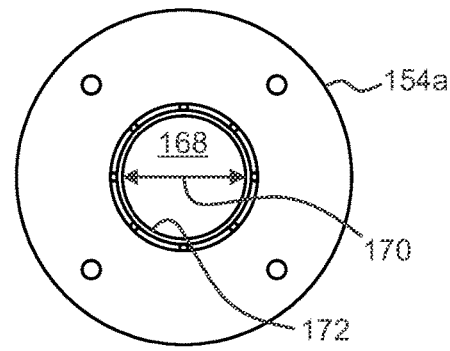
FIG. 14 is a top view of one example implementation of a mounting flange, wherein the sizing ring remains attached to the remainder of the mounting flange to provide a reduced flange aperture diameter.

Referring to FIGS. 11 and 14, the upper and lower mounting flanges may each have a removable sizing ring 172, and a flange aperture 168 defining an aperture diameter 170. For example, the sizing ring 172 may be integrally molded with the remainder of the mounting flange. Removal of the sizing ring 172 from the mounting flange increases the aperture diameter 170, thereby accommodating sprinkler elements 152 having larger body diameters.

Figure 13:
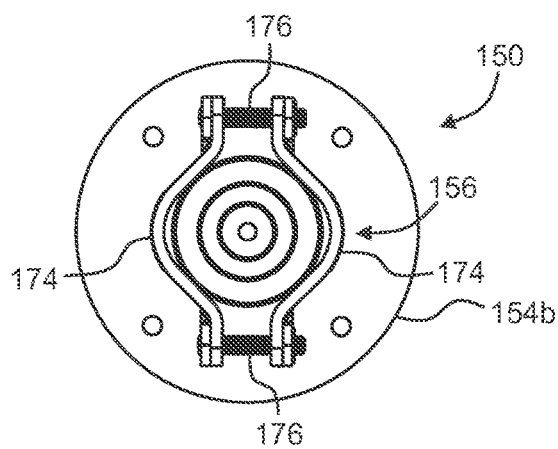
FIG. 13 is a bottom view of the sprinkler subassembly of FIG. 9.
Figure 15:
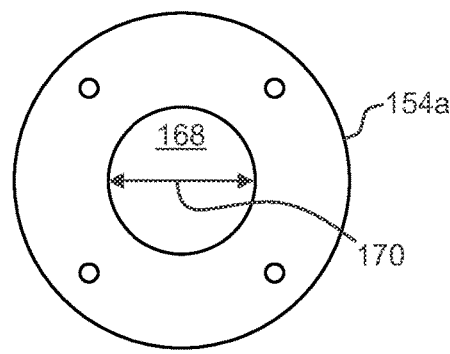
FIG. 15 is a top view similar to that of FIG. 14, but wherein the sizing ring has been removed from the remainder of the mounting flange to provide an enlarged flange aperture diameter.

Referring to FIGS. 10, 11 and 13, the mounting detent 156 may comprise a pair of clamp arms 174 adjustably securable to one another by way of, for example, one or more clamp fasteners 176 (e.g., bolts). In such case, the retention may be by way of clamping engagement between the mounting detent 156 and the sprinkler element 152. Fastener detents 178 (e.g., nuts) may be provided to engage respective clamp fasteners 176.

Figure 25:
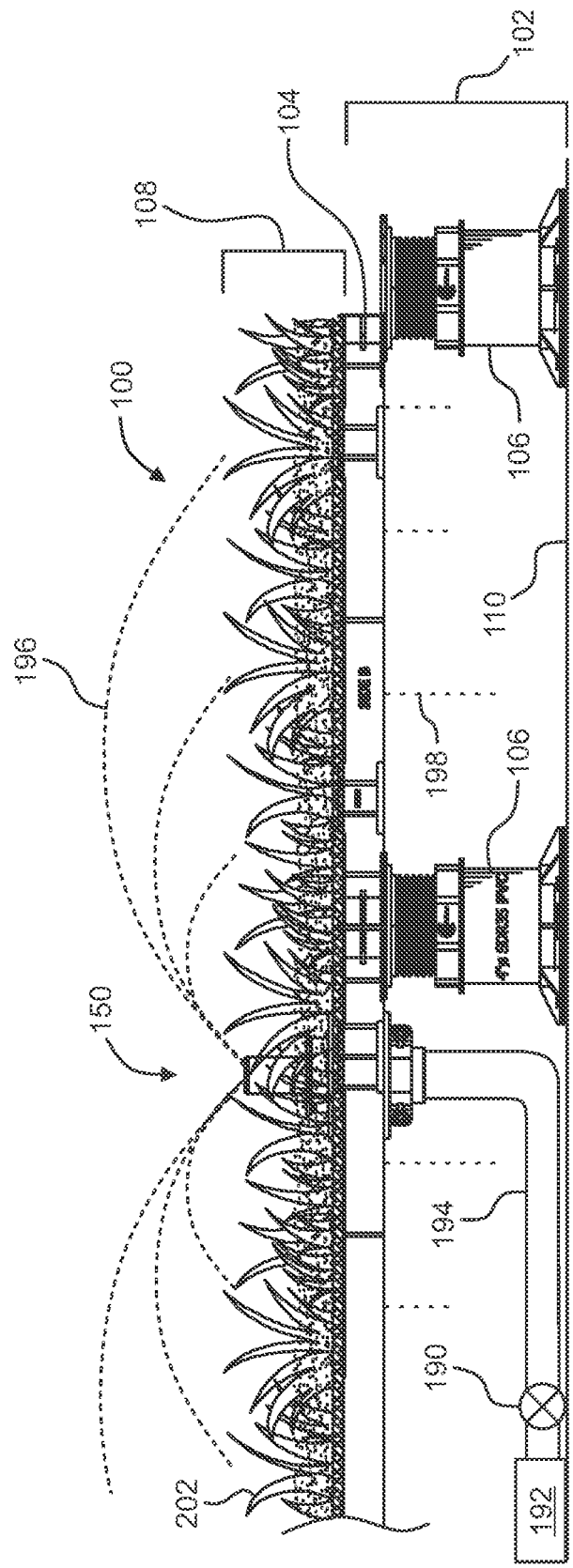
FIG. 25 is a cross-sectional view of an example implementation of a turf tray system with a sprinkler subassembly discharging water across the top of the turf elements, the water being supplied to the sprinkler element by way of a water source, a water valve, and associated piping.
Figure 26:
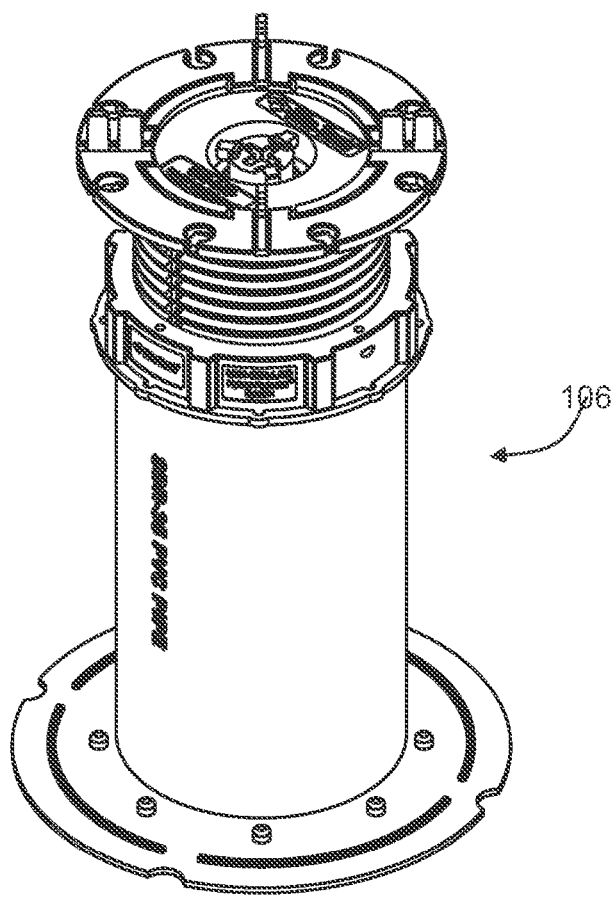
FIG. 26 is a diagrammatic perspective view of an example implementation of a pedestal element.
Figure 27:
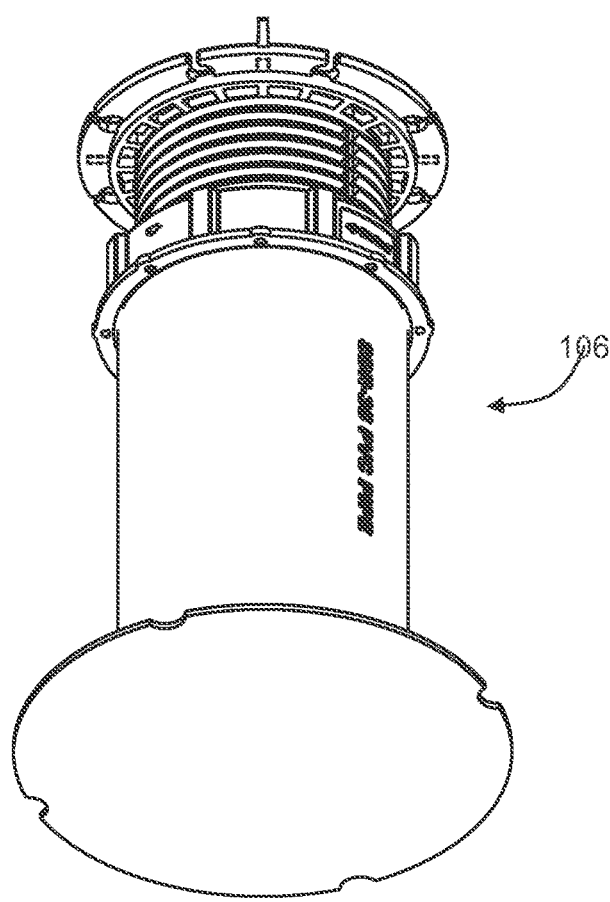
FIG. 27 is a further diagrammatic perspective view of the pedestal element of FIG. 6.
Figure 32:
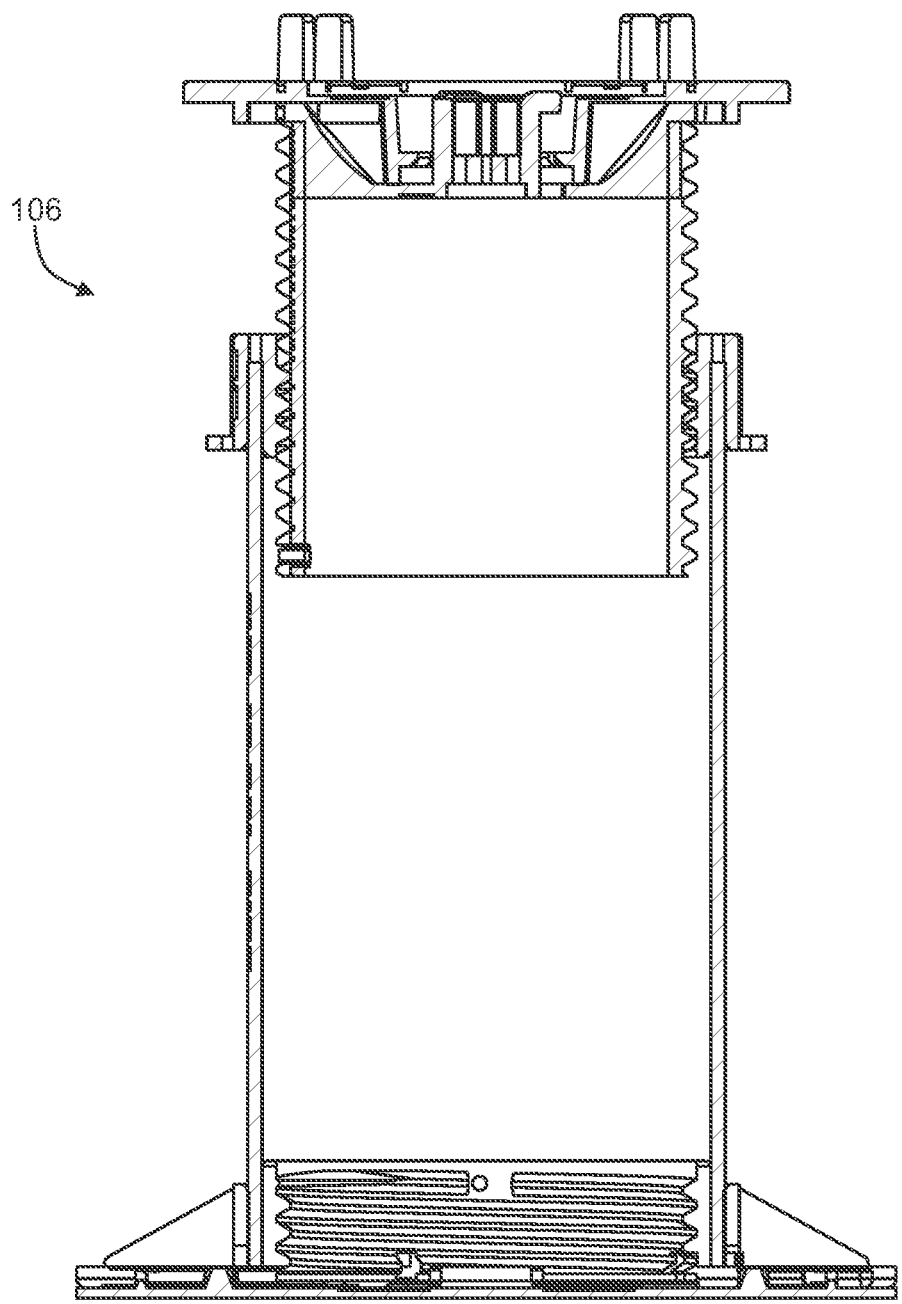
FIG. 32 is a diagrammatic cross-sectional view taken along lines 32-32 of FIG. 8.
Figure 33:
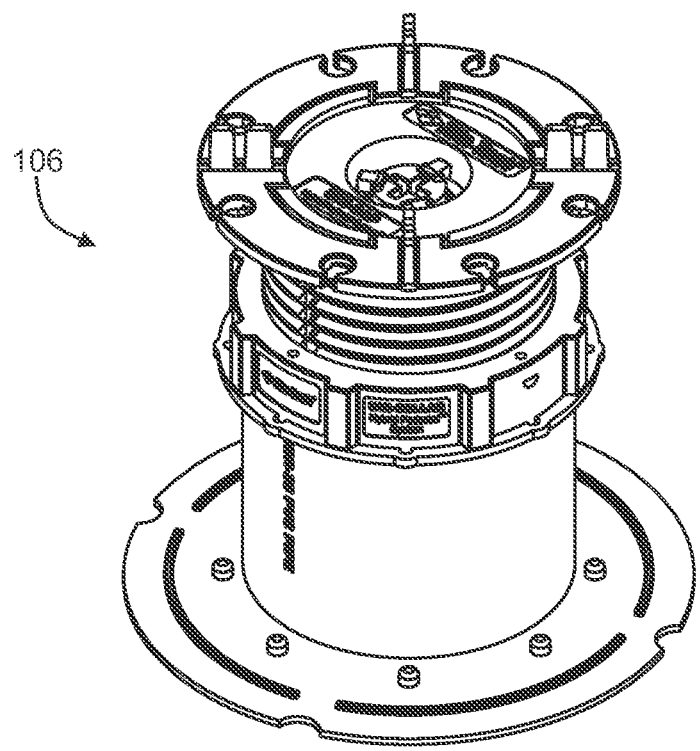
FIG. 33 is a diagrammatic perspective view of an alternate implementation of a pedestal element.
Figure 34:
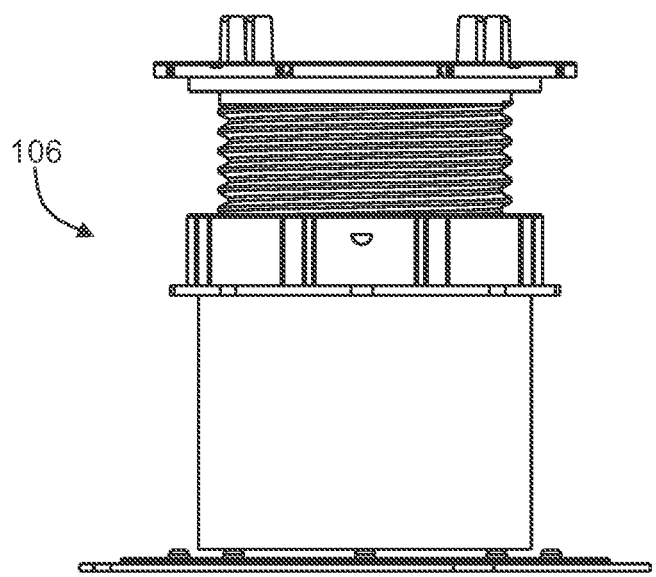
FIG. 34 is a diagrammatic side view of the pedestal element of FIG. 33.
Figure 35:
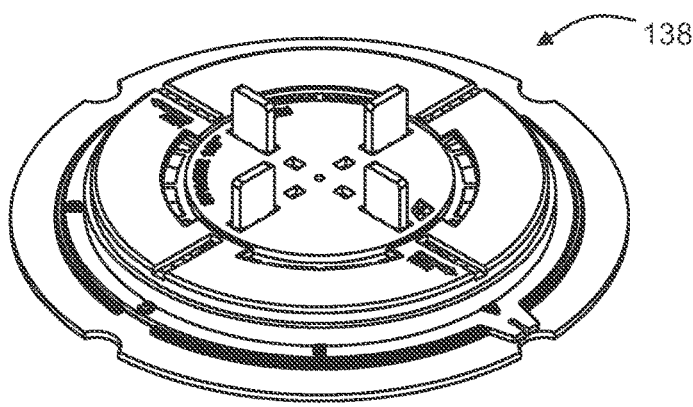
FIG. 35 is a diagrammatic perspective view of one example implementation a stack cap assembly.
Figure 36:
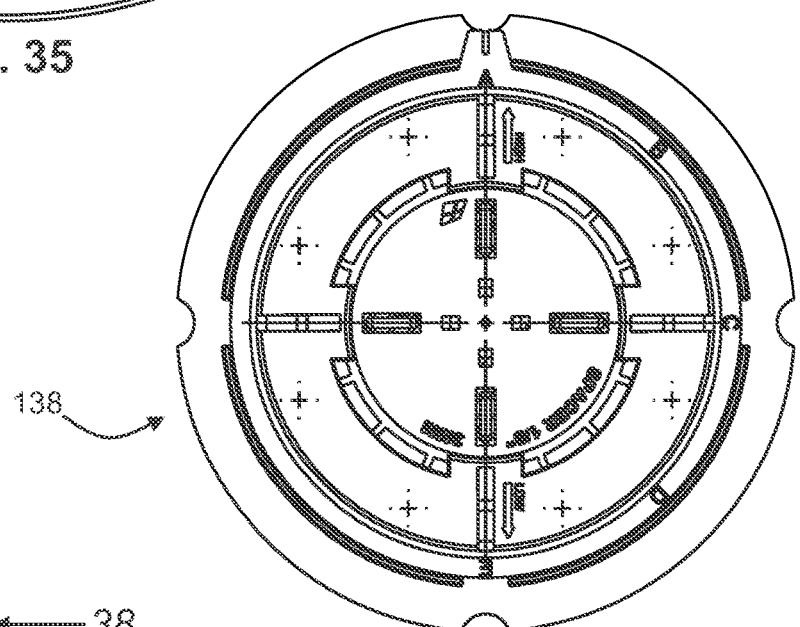
FIG. 36 is a diagrammatic top view of the stack cap assembly of FIG. 35.
Figure 37:
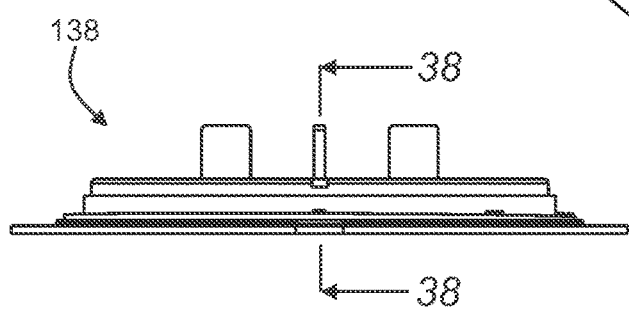
FIG. 37 is a diagrammatic side view of the stack cap assembly of FIG. 35.
Figure 38:
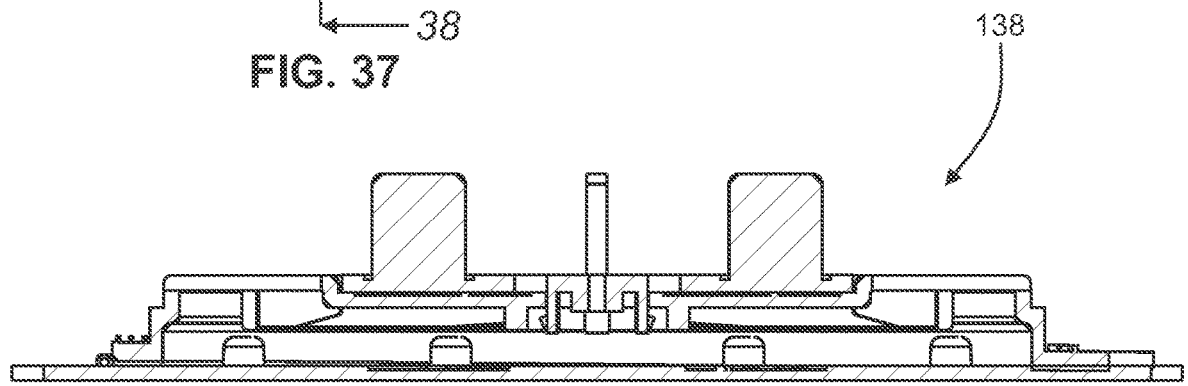
FIG. 38 is a diagrammatic cross-sectional view taken along lines 38-38 of FIG. 37.

Referring to FIG. 25, particular implementations of a synthetic turf system 100 may comprise a water source 192 (such as municipal water) and a water valve 190. The water source 192 may be configured to provide water to the sprinkler element 152 by the of the water valve 190. Water piping 194 may be in fluid communication between the water valve 190 and the pipe fitting 164. Referring to FIG. 19, the lattice structure 182 may define lattice apertures 184 therethrough. The lattice apertures 184 may be configured to allow water to drain from the backing portion 146 through the turf tray 104 (as shown, for example, in FIG. 25). Example, water discharge from the sprinkler head is illustrated at 196, and example drainage water is illustrated at 198.

Figure 3:
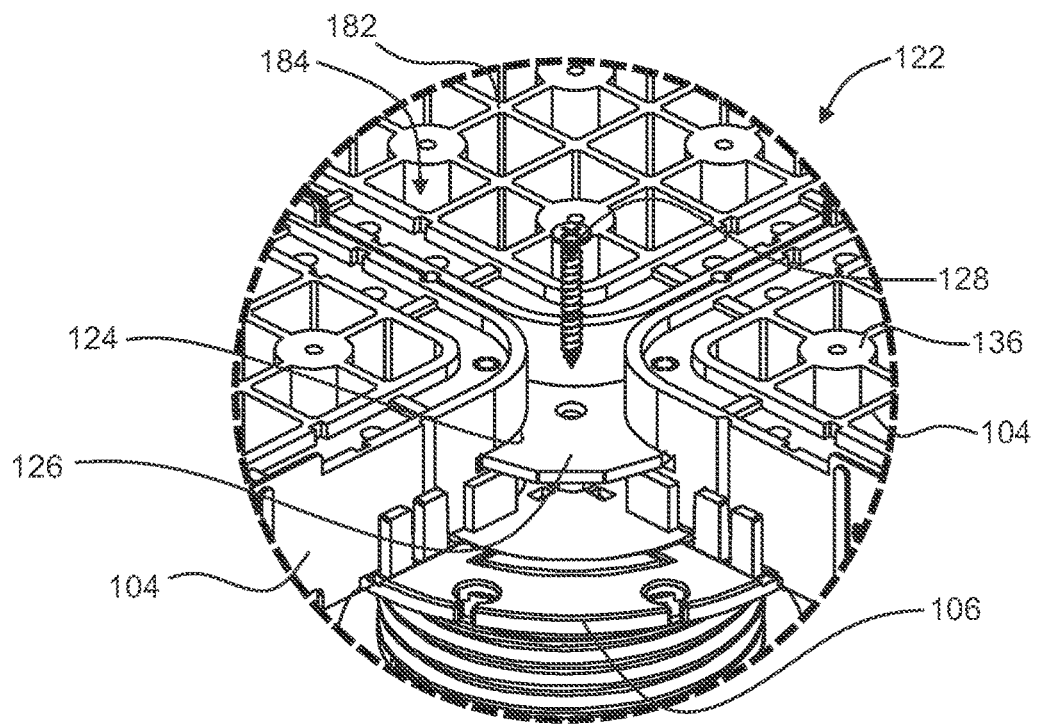
FIG. 3 is a partial perspective view of one example implementation of a pedestal securement interface, wherein a corner of the respective turf trays are secured to a pedestal element by way of a lock disk, the lick disk being received by lock disk slots in the corners of the turf trays and threadedly is being secured to the pedestal by a lock disk fastener extending through the lock disk.
Figure 5:
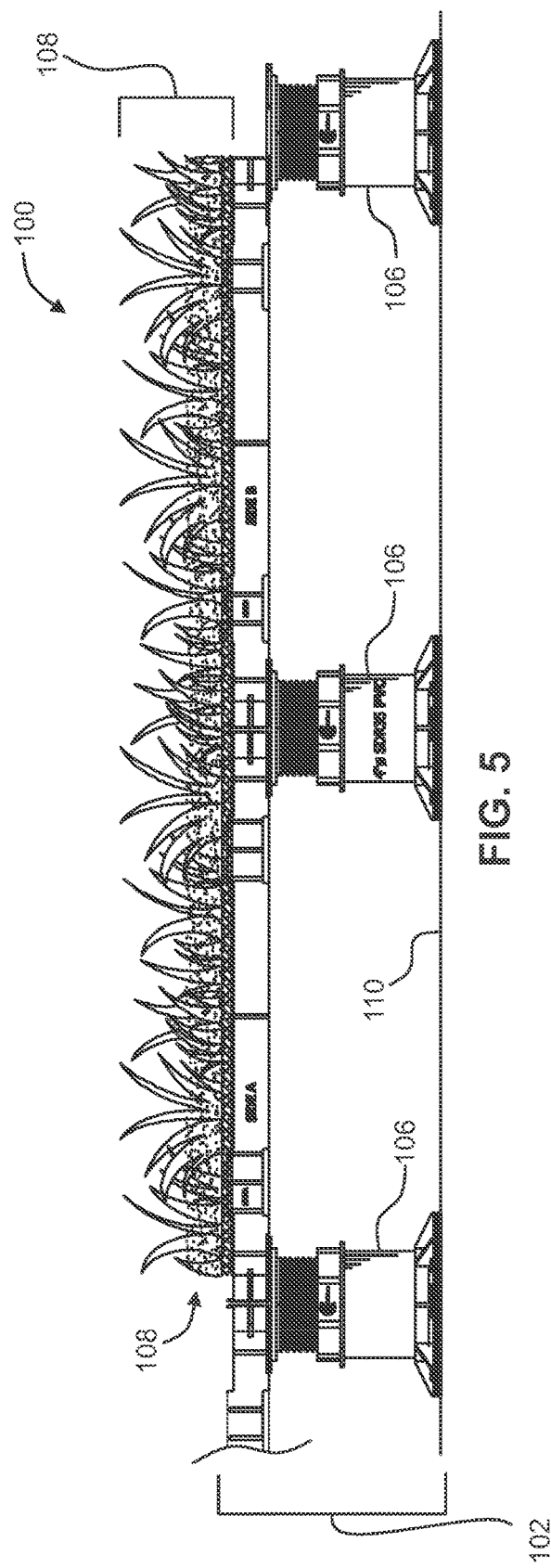
FIG. 5 is a side view of an example implementation of a synthetic turf system, wherein the turf element has been attached to a respective turf tray by way of adhesive engagement between the turf element and the adhesive tracks of the turf tray, or by way of threaded fasteners extending downwardly through the turf element and into threaded engagement with respective screw retention bosses in the turf tray.
Figure 6:
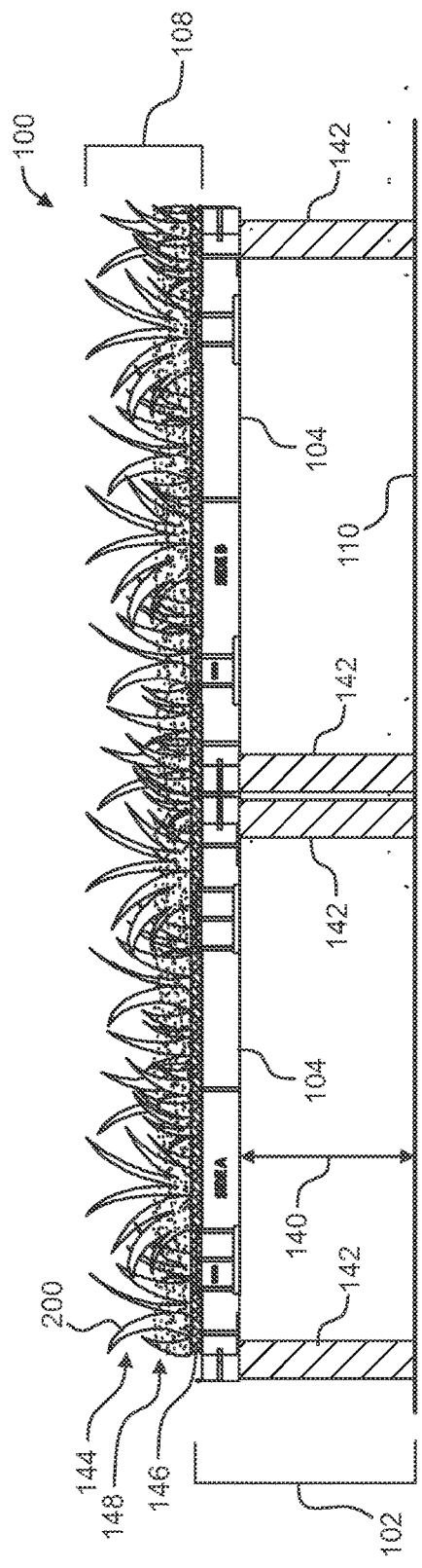
FIG. 6 is a side view of an example implementation of a synthetic turf system similar to that of FIG. 5, but wherein the support structure comprises a series of wooden joists supportingly disposed between the local horizontal substrate and the turf trays.
Figure 7:
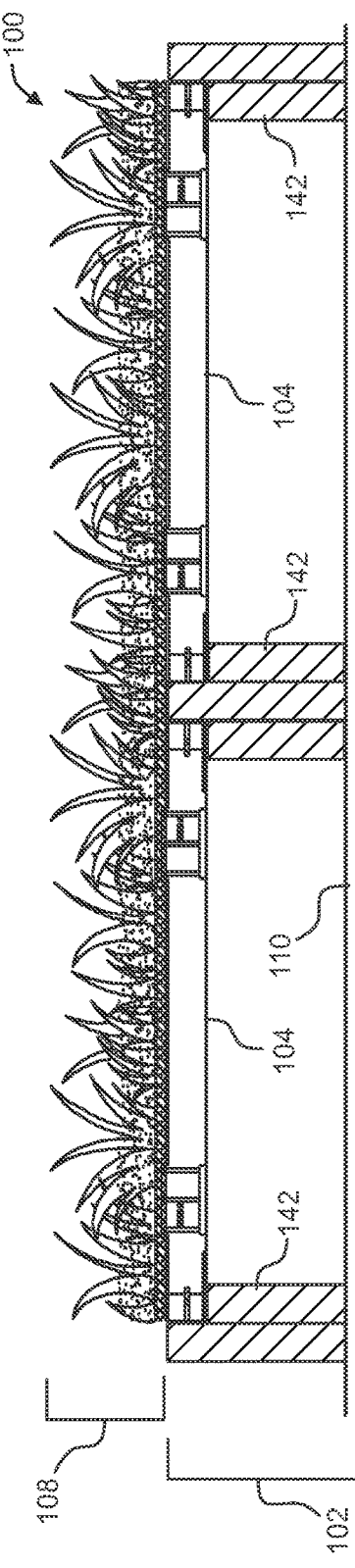
FIG. 7 is a side view of an example implementation of a synthetic turf system similar to that of FIG. 6, but wherein the series of wooden joists have a different configuration compared to those of FIG. 6.
Figure 8:
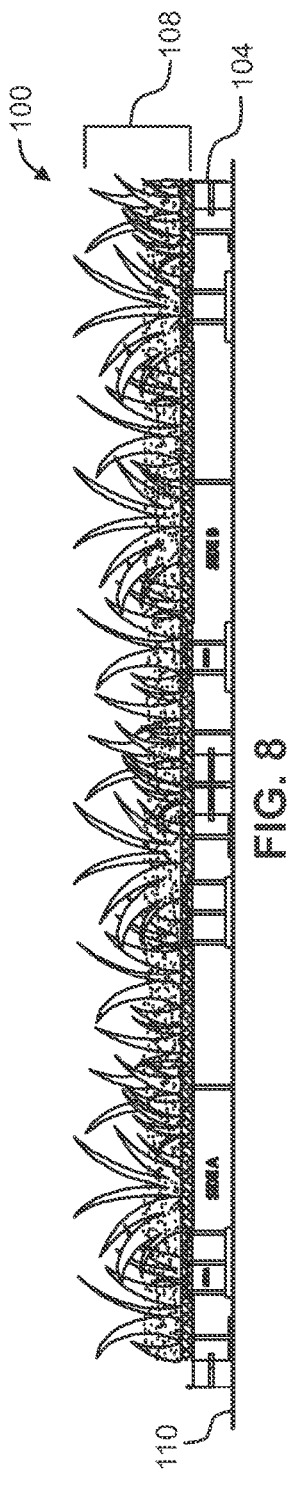
FIG. 8 is a side view of a further example implementation of a synthetic turf system, wherein the turf trays rest directly on the local horizontal substrate.
Figure 12:
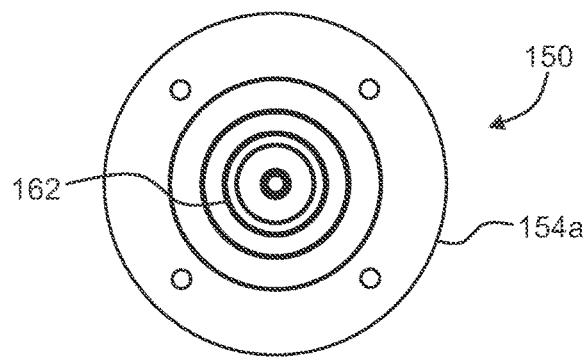
FIG. 12 is a top view of the sprinkler subassembly of FIG. 9.

Referring to FIGS. 1 and 5-8, certain implementations of the synthetic turf system 100 may comprise a plurality of the turf trays 104 distributed adjacently to one another. Referring to FIGS. 1 and 4-5, the synthetic turf system 100 may comprise a plurality of pedestal elements 106. Referring to FIGS. 2-4, the pedestal securement interfaces 122 may be configured to supportedly engage a respective pedestal element 106, thereby enabling the pedestal elements 106 to support the turf tray 104 at a distance 140 from a local horizontal substrate 110. Alternatively, referring to FIGS. 6-7, the synthetic turf system 100 may comprise a plurality of joist elements 142 supporting the turf trays 104 at a distance 140 from a local horizontal substrate 110. The local horizontal substrate 110 may be, for example, an existing roof or deck structure, or the ground surface. The combination of turf trays 104 and components such as pedestals 106 and joists 142 may define a support structure 102 of the synthetic turf system 100.

Certain preferred embodiments of a synthetic turf system 100 in accordance with the present disclosure may comprise one or more turf trays 104. Each turf tray 104 may be configured to supportedly engage respective pedestal elements 106, such that the pedestal elements 106 support the turf trays 104 at a raised distance 140 above the local horizontal substrate 110. The local horizonal substrate 110 may be, for example, a pre-existing ground, floor or roof surface.

In particular embodiments of the synthetic turf system 100, the turf trays 104 may preferably be substantially square-shaped. Referring to FIG. 2, the turf trays 104 may include one or more adhesive tracks, such as a perimeter adhesive track 116 and/or an auxiliary adhesive track 132. Referring to FIGS. 1, 3 and 23, the adhesive tracks may be configured to receive and retain a quantity of adhesive inserted therein (e.g., by way of an adhesive applicator 134) in order to adhesively bond the turf elements 108 to respective turf trays 104. Referring to FIGS. 2 and 4, additionally or in the alternative, the turf trays 104 may include an array of screw retention bosses 136. Each of the screw retention bosses 136 may be configured to threadedly receive a respective screw extending downward through the turf element 108 to threadedly secure the turf element 108 to the respective turf tray 108. Particular implementations of a turf tray 104, such as those shown in the several figures herein, may include both adhesive tracks (e.g., 116 and/or 132) and screw securement bosses 136.

Particular preferred implementations of a synthetic turf system 100 include a square grid structural tray 104 with an adhesive track and screw anchoring for the artificial turf. Regarding assembly, the trays 104 may be locked together using a lock disk 126 (e.g., hex lock disk), hex 2 mm spacer tabs and user-supplied screws (e.g., 1½ black rust proof screws) in addition to adhesive (e.g., Chem-Link™ M1 adhesive). It is recommended that the hybrid pedestal system be positioned and leveled, for example, onto grid/chalk lines. The turf trays 104 are then placed onto the pedestal system. Four adjacent corners 112 of respective turf trays 104 are leveled and secured to the pedestal system using, for example, a hexlock disk 126 secured with a deck screw 128. At termination points and walls the turf trays 104 can be cut to fit. Correspondingly, the turf element 108 can be stretched and secured to the respective turf tray 104 using, for example, adhesive applied to the adhesive track or mechanically fastened to the turf trays using screws.

Referring to FIG. 1, in certain preferred implantation of the synthetic turf system 100, the turf trays 104 may include a sprinkler aperture 130 through which a sprinkler (e.g., a conventional sprinkler head or riser) may extend. Such sprinklers may be used to wash down the turf elements 108 after heavy use. Relatedly, the open array design of the turf trays 104 may allow water passing through the turf elements 108 to drain down through the turf trays 104 and onto the local substrate 110 below.

Particular implementations of the synthetic turf system may comprise a series of joists in substitution for pedestal elements. In such implementations, the turf trays would be supportedly attached to the joists, and the turf elements would be attached to the turf trays as disclosed above.

The following listing matches certain terminology used within this disclosure with corresponding reference numbers used in the non-limiting examples illustrated in the several figures.

- 100 synthetic turf system
- 102 support structure (e.g., including pedestal elements and tray elements)
- 104 turf tray
- 105 lateral perimeter
- 106 pedestal element
- 108 turf element (e.g., synthetic turf/grass)
- 110 local horizontal substrate (e.g., pre-existing flooring, ground or roofing surface)
- 112 corner (of turf tray)
- 114 screw track (turf fastener track, e.g., comprising screw retention bosses)
- 116 perimeter adhesive track (e.g., perimeter adhesive channel)
- 118 first lateral side (of tray element; e.g., side "A")
- 120 second lateral side (of tray element; e.g., side "B")
- 122 pedestal securement interface (tray-to-pedestal)
- 124 lock-disk slot (in corners of turf tray elements)
- 126 lock disk (e.g., Hex lock disk)
- 128 lock disk fastener (e.g., deck screw)
- 130 sprinkler aperture
- 132 auxiliary adhesive track
- 134 adhesive applicator
- 136 screw retention boss (e.g., to threadedly receive turf securement screw)
- 138 stack cap assembly
- 140 distance
- 142 joist element (e.g., comprised of wood beam)
- 144 blade portion (e.g., pile of artificial grass blades)
- 146 backing portion
- 148 infill (of turf element; e.g., particulate or sand infill)
- 150 sprinkler subassembly
- 152 sprinkler element
- 154a upper mounting flange (e.g., mounting washer)
- 154b lower mounting flange (e.g., mounting washer)
- 156 mounting detent (e.g., mounting clamp)
- 158 body (of sprinkler element)
- 160 shaft (of sprinkler element)
- 162 head (of sprinkler element)
- 164 pipe fitting (of sprinkler element)
- 166 shoulder portion
- 168 flange aperture
- 170 aperture diameter
- 172 sizing ring (e.g., removable)
- 174 clamp arm
- 176 clamp fastener (e.g., bolt)

178 fastener detent (e.g., nut)
180 vertical direction
182 lattice structure
184 lattice aperture
186 upper side (of turf tray)
188 lower side (of turf tray)
190 water valve
192 water source
194 water piping
196 water discharge (from sprinkler)
198 water drainage
200 turf fastener (e.g., threaded fastener; e.g, screw)
202 blade of artificial grass While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A synthetic turf system comprising:
    a turf tray being rigid and planar, and having a lateral perimeter, an upper side, a lower side, and a lattice structure extending within the lateral perimeter; and
    a turf element having a backing portion and a blade portion, the blade portion being defined by a plurality of blades of artificial grass affixed to the backing portion, the backing portion being configured to be in secured engagement with the upper side;
    wherein the lateral perimeter includes a pair of first lateral sides disposed oppositely of one another, a pair of second lateral sides disposed oppositely of one another, and pedestal securement interfaces defined at each corner where the first lateral sides intersect a respective said second lateral side;
    wherein the turf tray includes a plurality of elongated adhesive channels disposed in the upper side, the adhesive channels being configured to receive an adhesive for bonding the backing portion to the turf tray; and
    wherein the turf tray includes an array of screw retention bosses disposed throughout the lattice structure, each screw retention boss being configured to threadedly receive a turf fastener for fastening the turf element to the turf tray.

2. The synthetic turf system of claim 1, wherein the adhesive channels include a perimeter adhesive track extending around the turf tray adjacent the lateral perimeter.

3. The synthetic turf system of claim 2, wherein the adhesive channels include a multiplicity of auxiliary adhesive tracks disposed inboard of the perimeter adhesive track.

4. The synthetic turf system of claim 3, wherein
    (a) at least one of the auxiliary adhesive tracks extends perpendicularly to the first lateral sides; and
    (b) at least one of the auxiliary adhesive tracks extends parallel to the first lateral sides.

5. The synthetic turf system of claim 1, wherein the synthetic turf system comprises a plurality of the turf trays distributed adjacently to one another.

6. The synthetic turf system of claim 1, wherein
    (a) the synthetic turf system comprises a plurality of pedestal elements; and
    (b) the pedestal securement interfaces are configured to supportedly engage a respective said pedestal element, thereby enabling the pedestal elements to support the turf tray at a distance from a local horizontal substrate.

7. The synthetic turf system of claim 1, wherein the synthetic turf system comprises a plurality of joist elements supporting the turf tray at a distance from a local horizontal substrate.

* * * * *